United States Patent [19]
Mitchell

[11] Patent Number: 5,226,191
[45] Date of Patent: Jul. 13, 1993

[54] KNEE PAD FOR HORSES

[76] Inventor: Ronald W. Mitchell, 271 SE. 5th Ter., Pompano Beach, Fla. 33060

[21] Appl. No.: 746,069

[22] Filed: Aug. 12, 1991

Related U.S. Application Data

[63] Continuation of Ser. No. 452,220, Dec. 18, 1989, abandoned.

[51] Int. Cl.5 .......................................... A41D 13/06
[52] U.S. Cl. .............................................. 2/24; 54/82
[58] Field of Search ........................ 2/24; 54/65, 82; 119/126, 143; 128/80 R, 165

[56] References Cited

U.S. PATENT DOCUMENTS

| 537,607 | 4/1895 | Green | 2/24 X |
|---|---|---|---|
| 714,044 | 11/1902 | Sell | 54/82 |
| 850,128 | 4/1907 | Beuer | 2/24 X |
| 872,060 | 11/1907 | Fitzgibbon | 54/82 |
| 1,417,742 | 5/1922 | Keller | 54/82 |
| 1,899,471 | 2/1933 | Meyer | 54/82 |
| 3,209,516 | 10/1965 | Hyman | 54/82 |
| 3,465,365 | 9/1969 | Jones et al. | 2/24 |
| 4,685,278 | 8/1987 | Mitsuoka | 54/82 |

FOREIGN PATENT DOCUMENTS 522718 6/1940 United Kingdom .................... 2/24

Primary Examiner—William A. Cuchlinski, Jr.
Assistant Examiner—Scott W. Cummings

[57] ABSTRACT

A lightweight and form-fitting knee pad for protection of the inner portion of the knee joints of the front legs of a harness racing horse is provided. An upper strap portion fits around the upper inwardly converging portion of the horse's knee joint while a downwardly extending portion fits over the horse's inner knee joints and slightly to the back thereof. A cutout in the front portion of the knee pad provides for clearance around the horse's knee cap. An elastic strap attached to the bottom of the knee pad allows for securement of the lower part of the knee pad to the horse's leg by allowing the strap to extend around on the outside and to the back and upper portion of the knee pad. The inventive knee pad thereby provides for complete protection of the inner portion of the horse's knee joint while reducing the overall size of the pad, minimizes the strike area, and allowing for the relative motion between the horse's legs and the form-fitting knee pad when the horse is bending its legs during running.

7 Claims, 3 Drawing Sheets

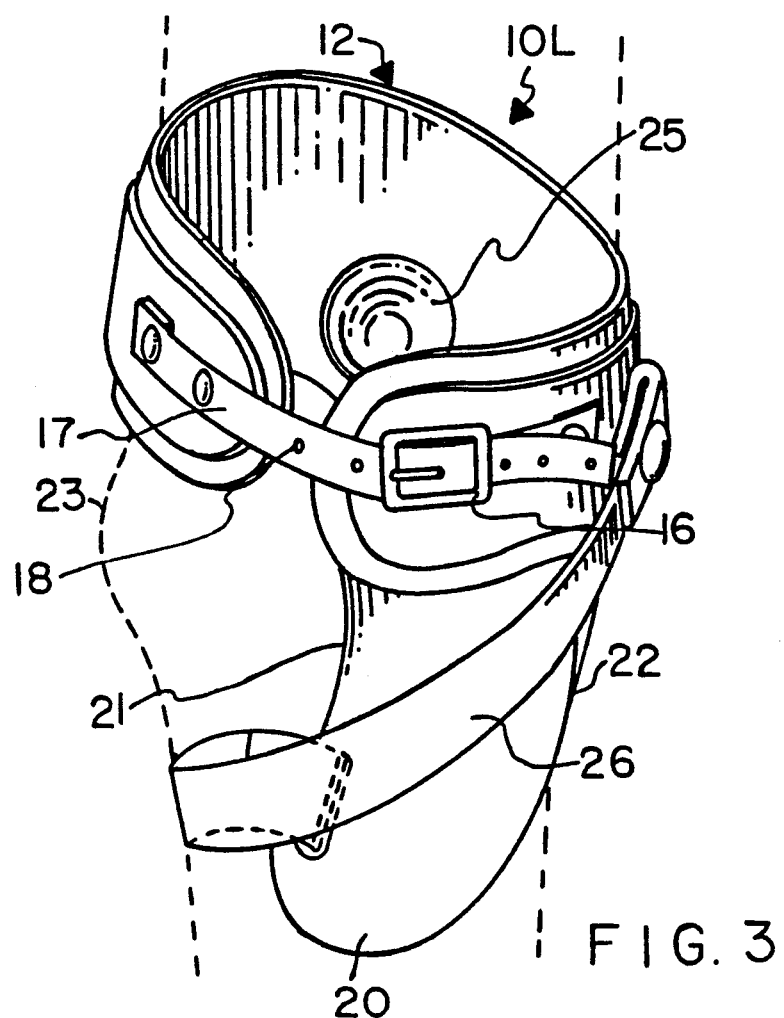
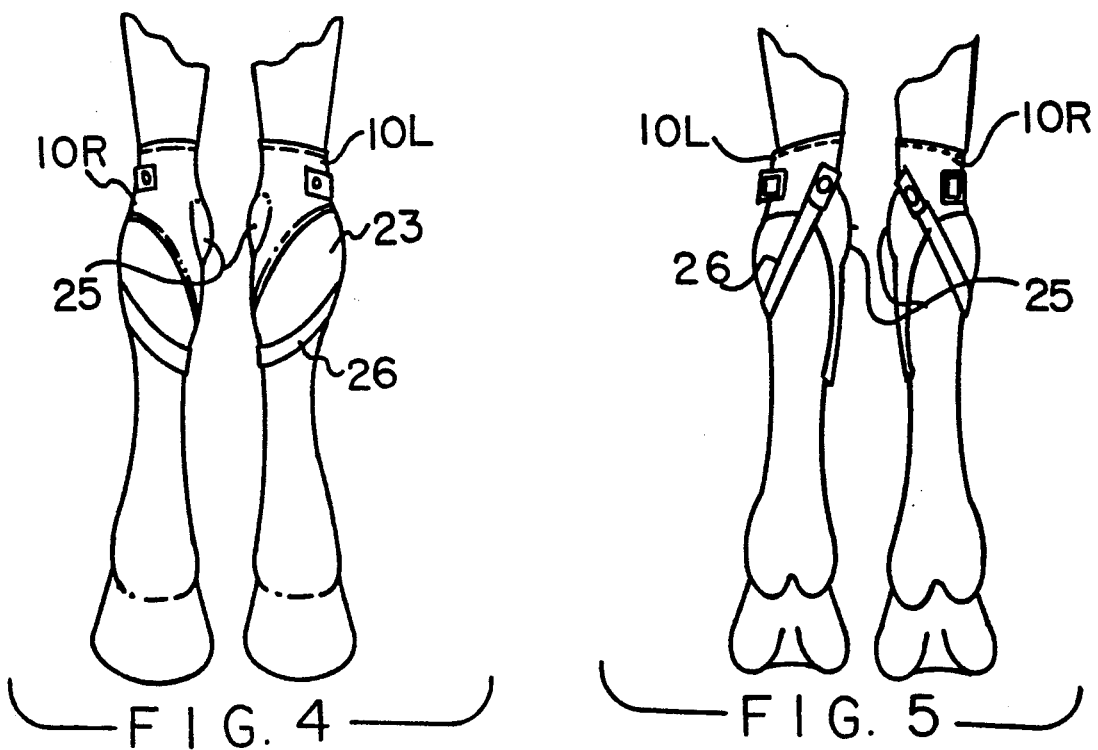

KNEE PAD FOR HORSES

This application is a continuation of application Ser. No. 07/452,220, filed Dec. 18, 1989, now abandoned.

BACKGROUND OF THE INVENTION

1. Field of the Invention

This invention relates in general to the field of protective equipment for harness racing horses and in particular to knee pads which fit on the inside of a harness racing horse's legs, which knee pads are adapted to prevent the horse from hurting himself when running due to the bumping or hitting of the inside portion of one of the horse's front knee joints by the hoof of the other front leg.

2 Description of the Prior Art

The prior art knee pads for harness racing horses are exemplified by the present day design of the same which comprises a complete covering for the inside of the horse's knee joints. The prior art knee pads are each strapped to one of the horse's legs such that the knee pads fit loose enough to allow the horse's legs to bend at the knee joint when the horse is running. In order to make certain that the knee pads are maintained in position, they are fitted with hooks (dees) to which are attached straps (suspenders) which extend from each of the knee pads to and around the horse's back. In this manner, the prior art knee pads will not fall below the horse's knee joints. However, as stated previously, sufficient looseness must be provided between the knee pads and the horse's knee joints so that the horse can bend its legs when running and such that the knee boots themselves do not gall or chafe the horse's inner legs. Unfortunately, the knee pads of the prior art are unable to adequately prevent such chafing or rubbing and thereby sores are often caused at the location of the knee pads.

Since the horse's knee joints are very knobby compared to the horse's legs above and below the knee joints, the prior art knee pads extend out into the space between the horse's legs at the knee joints. And, in order to accommodate the knobbiness of the horse's knee joints, an L-shaped pad extended outward from the inner surface of each of the prior art knee pads. This L-shaped pad fit around the horse's inside knee joints in order to attempt to have the inside surface of the knee pads in contact with the horse's knee joint anatomy while providing an outside or outer flat surface. Unfortunately, the bulkiness of such design of the prior art knee pads often results in the knee pads themselves being the cause of a horse bumping or hitting the knees of his front legs while running. Another problem of the prior art knee pads is the inability of the pads to remain in position on the horse's knee joint. Thus, there is the problem of the knee pad turning around on the horse's leg while he is running.

In accordance with the above, the prior art knee pads for harness racing horses are bulky, ill-fitting and tend to rotate around the horse's legs, require additional equipment to maintain them up at the horse's knee joint, often cause galling of the horse's knee joints and yet do not provide the requisite protection to the horse's inner knee joints.

Accordingly, it is a primary object of the present invention to provide knee pads for harness racing horses which are lightweight, provide a smaller strike surface, are not bulky, and fit snugly against the inside of a horse's knee joint and thereby improve the horse's confidence, speed and gait.

Another objective of the present invention is to provide knee pads for a harness racing horse which do not require additional equipment such as hooks and suspenders to maintain the knee pads in position on the horse's legs.

Another object of the present invention is to provide knee pads for a harness racing horse which closely conform to the anatomy of a horse's knee joint and yet provide for protection against the horse hitting his knees with his hoofs while running.

Yet another objective of the present invention is to provide a knee pad which allows freedom of movement and bending of the horse's legs without restriction by the knee pads.

The above-stated objects as well as other objects which although not specifically stated, but are intended to be included within the scope of the present invention, are accomplished by the present invention and will become apparent from the hereinafter set forth detailed description of the invention, drawings, and the claims appended herewith.

SUMMARY OF THE INVENTION

The present invention accomplishes the above-stated objectives as well as others, by providing a lightweight knee pad which closely conforms to the horse's knee joint anatomy and does not require the additional prior art equipment to maintain the knee pads in position on the horse's legs.

The knee pad of the present invention comprises a protective outer surface with a padded inner surface. The knee pad is provided with a special shape which includes a cutout for the horse's kneecap and an outward protrusion for the portion of the horse's knee bone which extends outward on the inner surface of the horse's leg towards the other leg. The inventive knee pad is strapped around the upper smaller part of the horse's knobby knee joint. The lower part of the knee pad includes an elastic strap which extends from the lower portion from the front inside, around the front, and then around and up the outside and back of the horse's leg to the upper portion of the knee pad where it is snap attached. These features of the inventive knee pad provide for a very snug fit and allow for unrestricted movement and bending of the horse's legs at the knee joint while preventing the same from rotating about the horse's leg and from falling downward on the horse's leg. A small strike area is provided whereby only that portion of the horse's inner knee bone is covered by the inventive knee pad so as to substantially cover the same which tends to be hit by the horse's hoofs while running. Thus, the inventive knee pad provides the horse with the required protection at the inside of its knee joints while not restricting the horse's forward and aft movement and bending action of the horse's legs while running. And, yet provides the horse with the necessary knee pad protection.

BRIEF DESCRIPTION OF THE DRAWINGS

Various other objects, advantages, and features of the invention will become apparent to those skilled in the art from the following discussion taken in conjunction with the following drawings, in which:

FIG. 3 is an isometric rendering of the left inventive knee pad adapted to a horse's left front leg at the knee joint portion thereof;

FIG. 4 is a front-to-back view of a horse's front legs showing the orientation of a pair of the inventive knee pads with respect to the front and side portions of the horse's front legs;

FIG. 5 is a back-to-front view of a horse's front legs illustrating the orientation of a pair of the inventive knee pads to the back and side portions of the horse's front legs; and, FIG. 6 is another embodiment of the inventive knee pad illustrating a left knee pad; and, FIG. 7 is a sectional view taken along the line 7—7 of FIG. 1.

DESCRIPTION OF THE PREFERRED EMBODIMENTS

Figure 1:
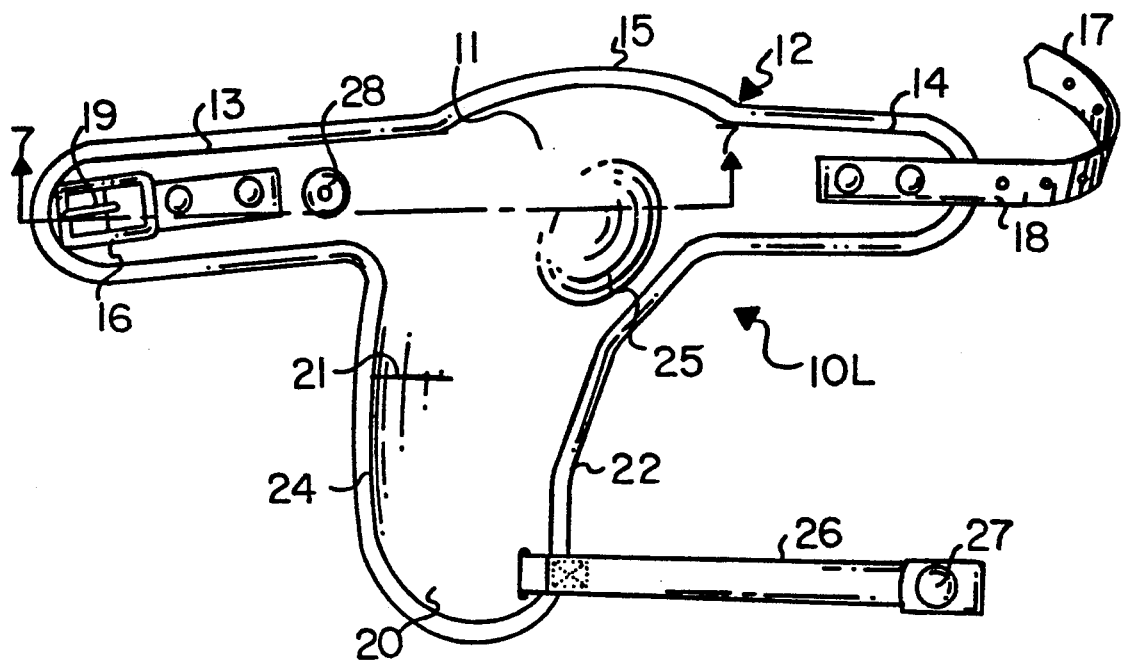
FIG. 1 is a plan view of a left knee pad laid out in a flat plane so as to illustrate the planar shape of the inventive knee pad.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are designated by the same reference numerals.

Figure 2:
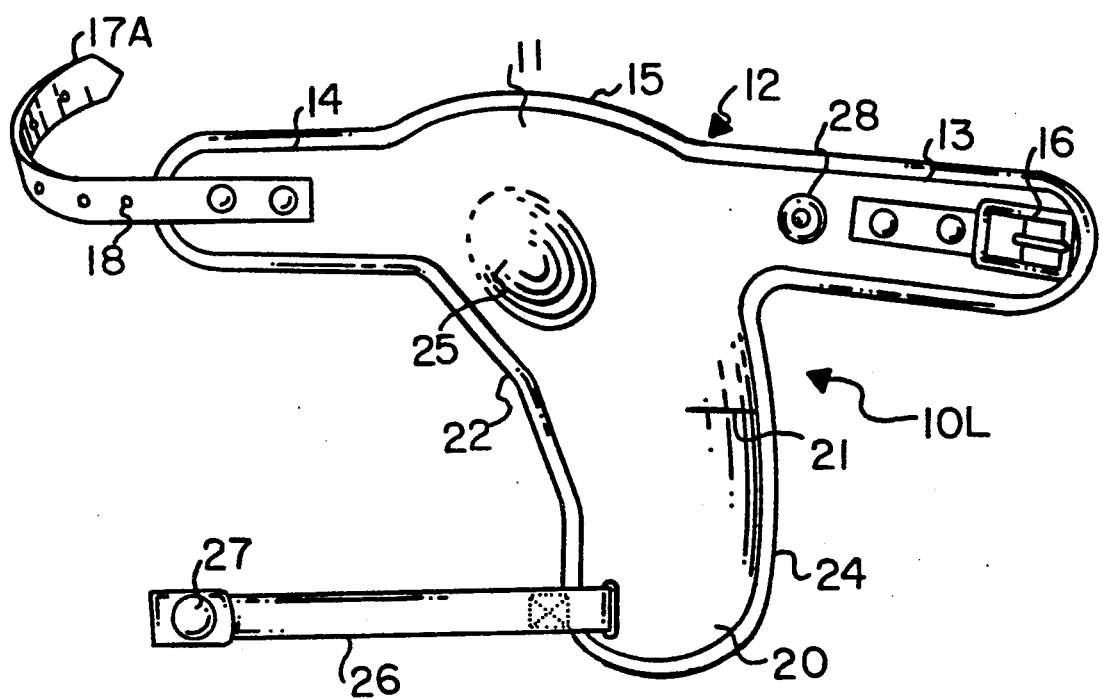
FIG. 2 is a plan view of a right knee pad also laid out in a flat plane.

Referring now to FIGS. 1 and 2 of the drawings, wherein each of a pair of the inventive knee pads is designated in general by the numeral 10 with the left knee pad being 10L while the right knee pad is 10R. Knee pad 10R is a mirror image of knee pad 10L and vice versa. The side, planar view of the knee pad 10L shown in FIG. 1, comprises an upper portion 11 which has a extending portion and strap extending from each side thereof so as to form a closure strap which fits around the upper converging or smaller portion of a horse's knee joint. As can be further seen in FIG. 1, the upper edge 12 of the knee pad 10L includes a convexly curved central portion 15. The central portion 15 of the upper edge 12 rises slightly above the extending arms 13 and 14 of the upper portion 11 of the knee pad 10L. The slightly rising center portion 15 as shown in FIGS. 1 and 2 is provided to cover the converging portion of the upper part of the horse's knee joint at the inside thereof. The curvature of the central portion 15 of knee pad 10 in conjunction with the extending arms 13 and 14 and the fastening means attached thereto, prevent the knee pad 10 from moving downward on the horse's leg or from moving around the horse's leg when the knee pad 10 is attached and the horse is in motion. This is accomplished by providing the knee pad 10 with a smaller circumferential length along the top edge 12 of the knee pad 10 as compared to the larger circumferential length along the horse's bulging knee joint therebelow. The convergingly inward configuration of the central portion 15 of the knee pad 10 further provides for such non-downward movement as well as provides a very close fit to the upper knobby portion of the horse's inwardly converging portion of the horse's knee joint.

Arms 13 and 14 have attached thereto fastening means, comprising a buckle and strap 16, and a mating strap 17, or may comprise any other suitable type of conventional fastener means. The strap 17 has a series of holes 18 therethrough, which holes 18 allow for fit up with the prong portion 19 of buckle 16 when the arm portions 13 and 14 are attached together around the upper outside portion of the horse's knee joint as shown in FIG. 3.

The lower portion 20 of knee pad 10 extends downward between arms 13 and 14 and forms an extension of central upper portion 11 of knee pad 10. Lower portion 20 includes one or more tucks 21 around the periphery of lower portion 20 so as to provide curvature of portion 20 of knee pad 10. The curvature thus provided to the lower portion 20 of knee pad 10 substantially coincides with the downward extending and convergingly inward lower portion of the horse's knee joint. Thus, upper central portion 11 and lower portion 20 of knee pad 10 allows for a minimal strike area and yet one which provides substantial coverage of that portion of the horse's inner knee joint which is prone to be hit by the horse's hoof of the other leg while the horse is running or otherwise moving. The relatively narrowness of lower portion 20 of knee pad 10 is to be noted as compared to the more than double the size of the same portion of the prior art knee pads.

Peripheral edge 22 of lower portion 20 of knee pad 10 is shaped such that the lower portion 20 and arm 14 portion fit around the protruding knee joint on the front inside part of the horse's leg. The back edge 24 fits around the relatively uniformly round portion of the horse's knee joint between the back thereof and the inner side thereof.

It may be seen in FIGS. 3, 4, and 5, that the combination of central upper portion 11 and the lower portion 20 of knee pad 10 provides for complete slightly forward, inside and slightly rearward protection of the horse's rounded portion of its knee joints.

By configuring edge 22 such that it extends circumferentially around the upper and back portion of the horse's inner knee bone 23 (but not the front portion thereof), it might be envisioned that edge configuration 22 provides a partial cutout in the planar configuration of knee pad 10 such that the horse's knee bone 23 may extend therethrough. By providing this configuration, the knee pad 10 is able to fit snugly against the horse's knee joint at the inner and back portions thereof without extending into the space between the inside of the horse's knee joints. In this manner, the inventive knee pad 10 prevents hitting of the horse's inner knee joints while not causing an additional probability of or contributing to such contact as caused by the more extending prior art knee pads. FIGS. 4 and 5 which show the front and back respectively, of the horse's front legs clearly show the protection afforded and equally show the compactness of the inventive knee pad 10.

As viewed from the outside of knee pad 10 in FIGS. 1 and 2, a convex (outward) protrusion 25 is provided at the lower junction of arm portion 14 and central upper portion 11. The cavity created by the underside of the protrusion 25 of knee pad 10 (see FIG. 3) fits over the bone of a horse's knee joint extending outward from the upward inner portion of the horse's knee joint. Protrusion portion 25 thereby provides protection for the protruding bone of the horse's knee joint while providing for additional closeness of fit up and fixational location of the knee pad 10 to the horse's knee joint. (See FIGS. 4 and 5.)

An elastic strap 26 is attached to and extends from the front and bottom of lower portion 20 of knee pad 10. After the knee pad 10 is secured to the horse's inner knee joint by attaching arms 13 and 14 by means of strap 17 and buckle and strap 16, strap 26 may then be extended around the outside of the horse's knee joint then around the back thereof at an upward diagonal and securely attached to the inner portion of strap 13 by means of snap fitting halves 27 and 28. Strap 26 thereby securely positions the lower portion 20 of knee pad 10 up against the lower convergingly inner portion of the horse's knee joint.

Elastic strap 26 provides yet another beneficial feature of the inventive knee pad 10. This feature comprises the necessary freedom between the horse's knee joint and the knee pad during movement of the horse's legs fore and aft as well as bending at the knee joint. The elasticity of strap 26 contracts during the bending motion of the horse's knee joints and expands during the straightening of the horse's legs while the horse is running, thereby providing freedom of motion between the knee pad and the horse's knee joint.

As stated above, the outside surface of knee pad 10 may comprise plastic or leather which may be lined on the inside thereof by an appropriate padding material such as plastic foam which conforms to the curved inside shape of knee pad 10. It is preferable that the edges of the inner cushioning lining of knee pad 10 extend beyond the outside edge of the outside leather or plastic portion thereof. This prevents the edges of the harder outside edges of the outer leather or plastic material from scraping against the horse's leg.

In FIGS. 3 and 4 the application of a pair of knee pads 10R and 10L are shown attached to a horse's front legs. The fit up and features described above can be clearly seen in these figures.

Figure 6:
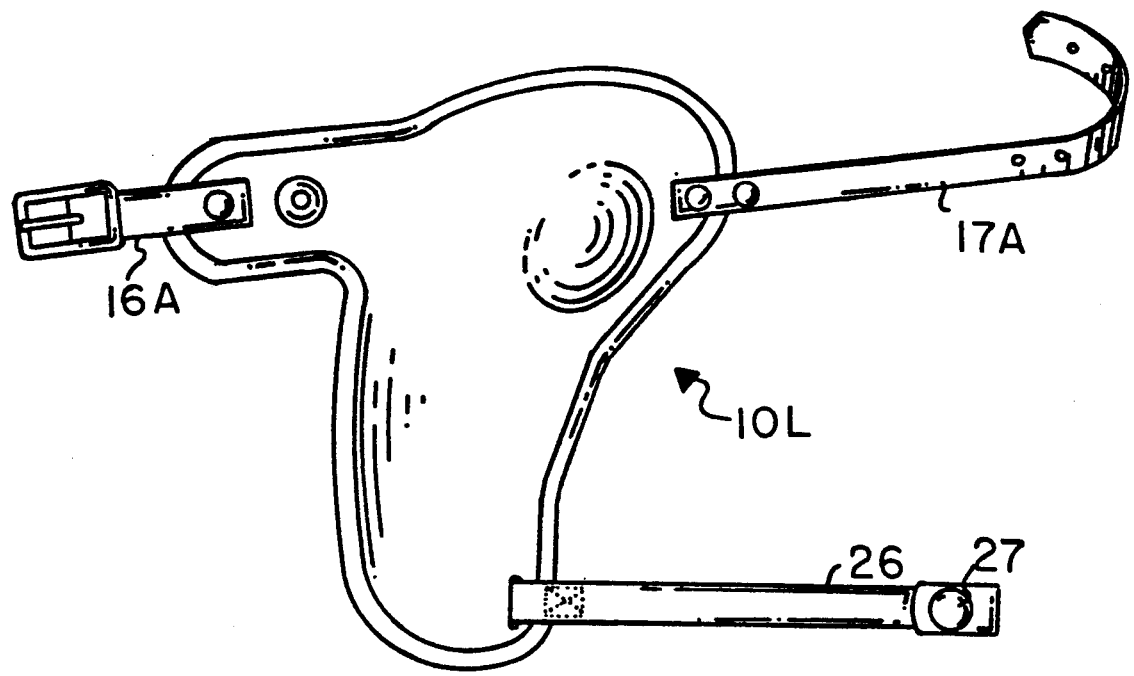

Another embodiment of the inventive knee pad 10 is shown in FIG. 6. In FIG. 6 a left knee pad is illustrated and it is seen that extending arms 13 and 14 are eliminated and replaced by a strap 16A for buckle and strap 26 and a longer strap 17A for strap 17. Straps 16A and 17A may either be elastic or leather or other like stretchable or nonstretchable material. If elastic is used, it provides the horse more freedom of leg movement and less leg restriction when the horse is running as compared to a nonstretchable strap without necessarily causing the knee pad to rotate about the horse's leg or to move downward on the horse's leg. On the other hand, a nonstretchable leather strap provides for firmly attaching the knee pad 10 to a horse's legs.

Figure 7:
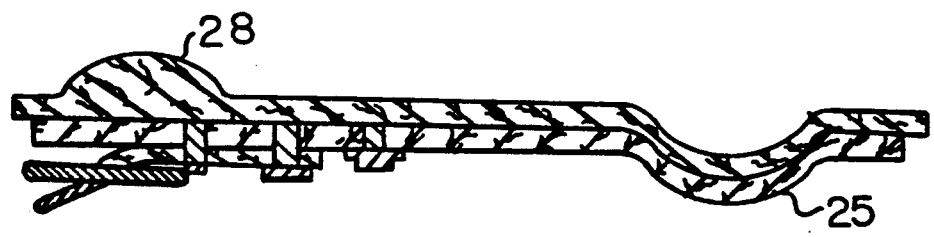

FIG. 7 illustrates, in cross section, the space provided by protrusion 25 and the space occupied by knob 28. Knob 28 fits within a depression located at the back outside portion of a horse's knee joint. Knob 28 in conjunction with protrusion 25, together serve to further orient and maintain the position of knee pad 10 on the horse's knee joint and thereby further assure that the strike area of knee pad 10 is properly positioned to protect the horse's knee joint.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. A knee pad adapted to fit around and over a knee joint of a horse's leg which knee joint includes, a rounded front portion, a rounded inside portion, and an outwardly protruding bone portion on the rounded inside portion comprising:
   an upper portion,
   a downward extending lower portion,
   means for maintaining said knee pad in position while providing the horse with freedom of motion so as to allow the horse to bend and straighten its knees while running,
   said lower portion including means for curvingly fitting said knee pad between the rounded inside portion and the rounded front portion of the horse's knee joint and over the inside portion of the horse's knee joint to substantially cover only an inside surface of the horse's leg at the knee joint, and
   means for accommodating the horse's protruding bone at the inside portion of its knee joint.

2. The knee pad of claim 1, wherein said position maintaining means comprises a fastener strap and buckle attached to said upper portion and extending sideways and outward thereof, an elastic strap attached to said lower portion and removably attachable to said upper portion, said upper and lower portions being curved along a common longitudinal axis thereof and proportioned to convergingly extend away from each other.

3. The knee pad of claim 1, wherein said curvingly fitting means comprises a first side edge of said lower portion extending concavely downward from the upper portion and a second opposite side edge extending substantially straight downward from said upper portion.

4. The knee pad of claim 1, wherein said protruding bone covering means comprises an approximate circular portion extending roundingly outward from an external surface of said knee pad so as to form a rounded indention inside of said knee pad.

5. The knee pad of claim 1, wherein said upper portion comprises a central portion with an extending side member at each side thereof, said central portion extending slightly above upper edges of said side extending members.

6. The knee pad of claim 3, wherein said lower portion is proportionally shaped, forming a convexly shaped outer surface in a direction transverse to a longitudinal axis extending along the length of the lower portion and forming a convexly shaped outer surface in a direction parallel to said longitudinal axis.

7. A knee pad adapted to fit around and over a knee joint of a horse's leg comprising:
   an upper portion,
   a downward extending lower portion,
   a first member extending from one side of said upper portion,
   a second member extending from a second opposite side of said upper portion,
   fastener means attached to said first and second extending members for attaching said upper portion around an upper converging portion of said horse's knee joint,
   a first side edge of said lower portion extending substantially straight downward from one of said extending members, a second opposite side edge of said lower portion extending concavely downward from the other of said extending side members, said lower portion and said upper portion being curved along a longitudinal axis thereof such that each portion coveringly extends away from the other portion, an approximate circular portion of said knee pad forming a protrusion on an outer surface of said knee pad and forming an indention on an inner surface of said knee pad, an elastic strap attached at one end to said lower portion and removably attachable at an opposite second end to the upper portion of said knee pad, and whereby said knee pad conformingly fits the inner surface of the horse's leg at its knee joint.

* * * * *